US008892648B1

(12) United States Patent
Durham et al.

(10) Patent No.: US 8,892,648 B1
(45) Date of Patent: Nov. 18, 2014

(54) MEDIA PLAYER SOCIAL NETWORK INTEGRATION

(75) Inventors: Scott Durham, Seattle, WA (US); Craig Pape, Lynnwood, WA (US); Scott K. Meaker, Seattle, WA (US); Erin O. Anderson, Seattle, WA (US); Paul William Roberts, Seattle, WA (US); Jim L. Dantzler, Newcastle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 232 days.

(21) Appl. No.: 13/173,494

(22) Filed: Jun. 30, 2011

(51) Int. Cl.
*G06F 15/16* (2006.01)

(52) U.S. Cl.
USPC ............................ 709/204; 709/205; 709/226

(58) Field of Classification Search
CPC ................................ G06Q 50/01; H04L 67/22
USPC .......................................... 709/204, 225, 226
See application file for complete search history.

(56) References Cited

U.S. PATENT DOCUMENTS

| | | | | |
|---|---|---|---|---|
| 8,090,666 | B2 | 1/2012 | Sarbaev et al. | |
| 8,180,798 | B2 | 5/2012 | Lourdeaux | |
| 2006/0218225 | A1 | 9/2006 | Hee Voon et al. | |
| 2007/0282950 | A1* | 12/2007 | Fischer et al. | 709/204 |
| 2007/0282987 | A1* | 12/2007 | Fischer et al. | 709/223 |
| 2008/0052371 | A1* | 2/2008 | Partovi et al. | 709/217 |
| 2009/0069912 | A1 | 3/2009 | Stefik | |
| 2009/0083541 | A1 | 3/2009 | Levine | |
| 2009/0197681 | A1 | 8/2009 | Krishnamoorthy et al. | |
| 2009/0249222 | A1* | 10/2009 | Schmidt et al. | 715/751 |
| 2009/0326970 | A1 | 12/2009 | Estrada et al. | |
| 2011/0270692 | A1 | 11/2011 | Harrang et al. | |
| 2012/0015693 | A1 | 1/2012 | Choi et al. | |
| 2012/0030587 | A1 | 2/2012 | Ketkar | |
| 2012/0072360 | A1 | 3/2012 | Sarbaev et al. | |
| 2012/0078953 | A1 | 3/2012 | Araya | |
| 2012/0158531 | A1* | 6/2012 | Dion et al. | 705/26.1 |
| 2012/0296974 | A1 | 11/2012 | Tabe | |

OTHER PUBLICATIONS

Sehr, Andres. "Spotify—The Next Generation." Apr. 27, 2010. pp. 1-2. Retrieved from https://www.spotify.com/us/blog/archives/2010/04/27/the-next-generation/.*

Kreitz et. al. "Spotify—Large Scale, Low Latency, P2P Music-on-Demand Streaming." Aug. 27, 2010. 2010 IEEE Tenth International Conference on Peer-to-Peer Computing. pp. 1-10.*

* cited by examiner

*Primary Examiner* — Nicholas Taylor
(74) *Attorney, Agent, or Firm* — Thomas | Horstemeyer, LLP

(57) ABSTRACT

A media player user interface on behalf of a user associated with a user account is generated that has a social network module that includes media updates associated with other users to which the user is linked. Media player actions associated with the user occurring in the media player user interface are also captured, updates are generated and provided to social network modules in a media player user interface associated with other linked users.

16 Claims, 6 Drawing Sheets

MEDIA PLAYER SOCIAL NETWORK INTEGRATION

BACKGROUND

Users may play or browse media in a media player and/or a media player user interface. Users may also be linked with other users in various social networking systems who may also play or browse media in a media player. Users may have an interest in learning about the media consumption habits of other users to which they are linked via social networking systems, or from whom they receive content in blogging networks, microblogging networks, and the like.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Embodiments of the disclosure are directed to facilitating social networking integration with the consumption of media in media players and/or media player user interfaces generated by media hosting and/or storage systems. Users who are linked with other users in a social networking system may wish to view media consumption activity of other users. In the following discussion, a general description of the system and its components is provided, followed by a discussion of the operation of the same.

Figure 1:
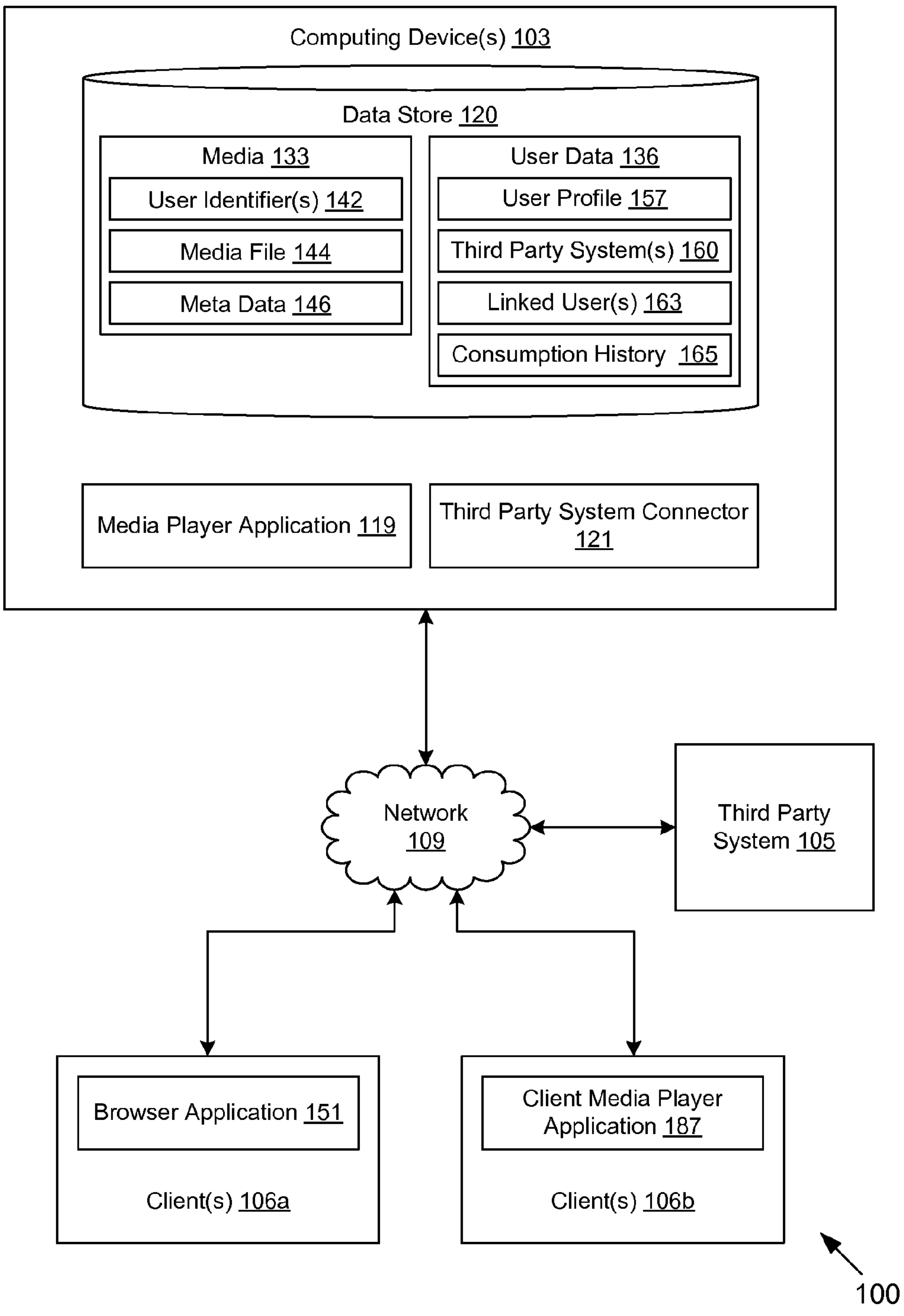
FIG. 1 is a drawing of a networked environment according to various embodiments of the present disclosure.

With reference to FIG. 1, shown is a networked environment 100 according to various embodiments. The depicted networked environment 100 illustrates one example of an implementation of a system according to an embodiment of the disclosure. It should be appreciated that embodiments of the disclosure can be implemented in various ways. The networked environment 100 includes at least one computing device 103, a third party system 105, and one or more clients 106 in communication over a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements.

For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above. Additionally, the third party system 105 can also be implemented in one or more computing devices.

Various applications and/or other functionality may be executed in the computing device 103 according to various embodiments. Also, various data is stored in a data store 120 that is accessible to the computing device 103. The data store 120 may be representative of a plurality of data stores as can be appreciated. The data stored in the data store 120, for example, is associated with the operation of the various applications and/or functional entities described below.

The components executed on the computing device 103, for example, include a media player application 119, a third party system connector 121 and other applications, services, processes, systems, engines, or functionality not discussed in detail herein. In one embodiment, the media player application 119 is executed to generate a media player user interface rendered in a browser or other application on a client 106. In some embodiment, the media player application 119 can be executed to provide data to a media player application executed on a client 106 as well as allow the user on a client 106 to submit data via a local media player application as will be described herein. The media player application 119 can allow users to access media stored in the data store 120 and/or any other system, such as a cloud storage system. In some embodiments, the media player application 119 can provide information about media, other users, and other data to an application executed on a client that accesses media stored locally on a client and/or a storage device accessible to the client. In some embodiments, the media player application 119 can allow the user to purchase and/or rent media that is downloaded and/or streamed to a client associated with the user.

The third party system connector 121 can facilitate communication with an application programming interface provided by a third party system 105. The third party system connector 121 can facilitate publishing data within a third party system and/or retrieving data regarding users from the third party system provided appropriate authentication credentials such as a username/password pair, an authentication token, etc., are available. For example, a third party system 105 can provide an application programming interface (API) with which users or other entities can develop applications. The API can, subject to authorization of a user, expose various functionality of a social networking system to applications using the API, such as access to information about users, their friends, interests, images, videos, etc. In this way, the media player application 119 can, via the third party system connector 121 and the API, publish content and/or retrieve content from the third party system 105 and subsequently display the content in a media player user interface as will be described herein.

Also, the computing device 103 can include at least one data store 120, which may comprise data and applications operable to provide access to the data stored therein. It should be appreciated that the data store 120 may or may not reside within a computing device 103, but may be accessible via a network to the computing device 103. The data store 120 can include media 133, which can include various information about media associated with a user that can be consumed in a media player user interface. In the context of the present disclosure, media can include audio, video, images, or any other type of media that can be viewed and/or streamed to a client 106. Various media 133 stored in the data store 120 can be associated with one or more users. Accordingly, each media 133 entry can be associated with one or more user identifiers 142. In one embodiment, users can purchase and/or upload media 133 to be stored in the data store 120. Therefore, the user identifiers 142 associated with media 133 entries can be employed to manage access restrictions and/or digital rights management issues as should be appreciated. In one example, the user identifiers 142 associated with a media 133 entry can identify users of the system that own or have the authority to download, play and/or stream the media 133.

Each media 133 entry can also include a media file 144. A media file 144 can include a digital media file representing the media entry in one or more of various media formats. For example, the media file 144 associated with a media 133 entry can include, but is not limited to, an MPEG-1 Audio Layer III (MP3 file) representing an audio track, an MPEG 4 audio file, flash video (flv file), or any audio, video, or image format in which media can be stored and/or streamed to a client 106. Each media 133 entry can also be associated with various meta data 146, which can include artist information, a title, author, album association, genre, or any other data by which a media 133 entry can be categorized.

The data store 120 can also include user data 136, which can store information about users of a media player application 119 as described herein. User data 136 can include, for example, a user profile 157, which can include demographic information about a user, shipping addresses, telephone numbers, payment information, e-mail addresses, purchasing history, product browsing history, affinity groups with which the user is affiliated, and other data related to users. User data 136 can also include one or more third party systems 160 with which the user is associated. In one embodiment, a user of the media player application 119 can link one or more third party sites with an account of the user, which can allow the media player application 119 to access content associated with the user from the third party site as well as potentially publish information about the user's media consumption and/or interests in the third party site.

User data 136 can also include identifiers associated with one or more linked users 163 with which the user is linked in a site facilitated by the media player application 119. Linked users 163 can include friends or other acquaintances of the user that the user has authorized to receive information about the user's media consumption and/or interests. Additionally, the linked users 163 represent other users for which a user desires to receive information about media consumption and/or interests. User data 136 can also include a consumption history 165 associated with a user account. In one embodiment, a consumption history 165 can include a browse history of various media available via the media player application 119, media that the user has played and/or indicated an interest. Information from the consumption history 165 of the user can be shared with other users of the media player application 119 and/or published in third party systems.

The third party system 105 can include any type of user community, a microblogging service, etc. A user of a social networking system can have an identity and interact with other users of the social networking system, publish content, and take advantage of other functionality generally found within a social networking system. Users can have a direct connection to other users. In one embodiment, a user can establish a direct connection within a third party system 105 with another user who is considered a friend. Users of the social networking system can also have an affiliation with a location, interest groups, topics, or other non-user entities. As one example, a user in a third party system 105 can establish an association with a university or any other topic that interests the user and be connected with other users establishing the same association. Other variations should be appreciated, as should the general functionality of this and other examples of a third party system 105.

A user of a third party system 105 can publish content that can be viewable to other users linked to the user. In some third party systems 105, for example, the content can be available to "friends," "followers" and/or users in the publisher's "network." As some examples, the user can publish text, images, video, and other media. In other words, a user can publish a "feed," which can be available to other users in the third party system 105. Users can also be associated with a timeline and/or a news feed, which can, among other things, include information regarding other users with which they are associated in the third party system 105. As some examples a timeline of a user can include information such as birthdays, anniversaries, and/or other events associated with other users with which the user has a connection. Accordingly, the third party system 105 can also maintain a user data store, which can house information about the various users the third party system 105. In the depicted example, the user data store can store profile data as well as user associations or linkages within the third party system 105.

The client 106 is representative of a plurality of devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The client 106 may be configured to execute various applications such as a browser 151 and/or other applications. The browser 151 may be executed in a client 106, for example, to access and render network pages, such as web pages, or other content served up by the computing device 103 and/or other servers in which a media player user interface generated by the media player application 119 can be rendered. The client 106 may be configured to execute applications beyond a browser 151 such as, for example, email applications, instant message applications, and/or other applications. Accordingly, in some embodiments a user can manipulate a user interface presented in the form of network pages shown on a display device via the browser 151 or other application that causes interaction with the third party system 105 and/or computing device 103.

Another example of a client 106 that can interact with the third party system 105 and/or computing device 103 includes a mobile device, which can execute an application such as a browser and/or client media player application 187, which can allow the user to download, upload and/or stream media to or from the media player application 119 as well as transmit and/or receive information that can be displayed in the user interface rendered on the client 106*b*. In some embodiments, such a client may also include a desktop computer, tablet computing system, smartphone, or any other device in which a special purpose client media player application 187 can be executed.

Next, a general description of the operation of the various components of the networked environment 100 is provided. To begin, the media player application 119 can allow users to consume media stored in the data store 120 and/or on a client 106 in a media player user interface generated by the media player application 119 and rendered in a browser 151. The media player application 119 can also provide data that can be displayed in a media player user interface generated by a client media player application 187 executed on a client 106. In embodiments of the disclosure, the media player application 119 can facilitate a social network module in a media player user interface that displays data regarding media consumption of other users to which a user is linked as well as information about media in which the user may have an interest. The social network module populated by the media player application 119 can provide this data in real time as a user is interacting with a media player user interface.

The media player application 119 can capture activity of a user in a media player user interface and generate an update that can be displayed in a social network module in a media player user interface of other users to which the user is linked. In one embodiment, a user can authorize various actions to be captured and displayed in a social network module for other users to whom the user is linked in a social networking system or any other system. In other words, a user can authorize updates regarding his or her media consumption, media interests, likes, dislikes, etc., to "friends" and/or "followers." Accordingly, the media player application 119 can capture certain actions in a media player user interface related to, for example, the playing of media (e.g., a song, album, movie, video, etc.), and generate a corresponding update in a social network module of other users, whether the media player user interface exists in a client media player application 187 or a browser rendered media player user interface. Similarly, the client media player application 187 can also capture various action of a user and transmit data about these actions to the media player application 119, which can update a social network module in a media player user interface of another user.

As another example, a media player user interface can include one or more user interface elements that allow a user to indicate that he or she likes a particular media item, and a corresponding action can be captured by the media player application 119. Accordingly, the media player application 119 can identify other users to which the user is linked in a social networking system or other system, and generate an update in the media player user interface corresponding to these users in real time if these users are associated with a presently executed media player user interface. In another example, the media player application 119 can capture actions of a user in a media player user interface and identify other users to which the user is linked, generate updates corresponding to these actions, and store these updates in a consumption history 165 of the user. Accordingly, if another user to which this user is linked later initiates a media player user interface, the media player application can populate a social network module with updates from the consumption history 165. In another embodiment, media updates associated with another user to which a user is linked can be stored in an activity feed in a user profile 157 of the user, which can be displayed when a user initiates a media player user interface.

Media updates displayed in a social network module can also include information from artists and/or publishers of media to which the user has subscribed and/or in which the user has expressed an interest. In one embodiment, the media player application 119 can identify content related to artists and/or publishers in which the user has expressed an interest and update the social network module with the content. For example, the media player application 119 can populate the social network module with information about media from an artist available to purchase, rental and/or download, announcements from the artist itself, or any other information related to the artist that can be identified by the media player application 119.

A media player user interface can also allow a user to generate comments that are linked to items presented in a social network module. These comments can be thought of as activity that can in turn be associated with an update that can be presented in the social network modules of other users to which the user generating the comment is linked.

A user can designate various third party systems 105 in which updates corresponding to actions taken by the user in a media player user interface can be published. Accordingly, as noted above, the media player application 119 can publish updates corresponding to actions in a media player user interface that are captured in various third party systems. Therefore, the third party system connector 121 can communicate with an API provided by a third party system 105 to publish an update via an account corresponding to the user corresponding to an action in a media player user interface. In one example, the media player application 119 can, via the third party system connector 121, generate a post in a microblogging network and/or a social networking system in an account corresponding to a user that identifies a track played by the user in a media player user interface. As another example, the media player application 119 can generate a post in a social networking system that identifies a song, artist, album, or other aspects of media accessible via the media player application 119 that a user "likes."

The media player application 119 can also retrieve information from third party systems 105 and populate the social network module with information related to a user's media collection, the user's interests, and/or a track currently being played by the user in a media player user interface. As one example, the media player application 119 can retrieve content published by or about an artist, song, and/or album in a third party system 105 and populate the social network module with the retrieved content.

The media player application 119 can also allow users to share music with other users to whom they are linked whether they are linked to the user in a social networking system or any other type of system. In this way, the media player application 119 can facilitate a communal media experience among linked users. In one embodiment, the media player application 119 can populate the social network module with information about a song that a linked user is currently playing. Accordingly, the user can join the listening experience with the linked user. In one implementation, the media player application 119 can determine a current track position of a track that the linked user is currently playing and initiate a new music stream to the user via a media player user interface that is synchronized with the track position of the linked user. In another embodiment, the media player application 119 can simply provide access to the user to an audio stream being transmitted to the linked user.

Figure 2:
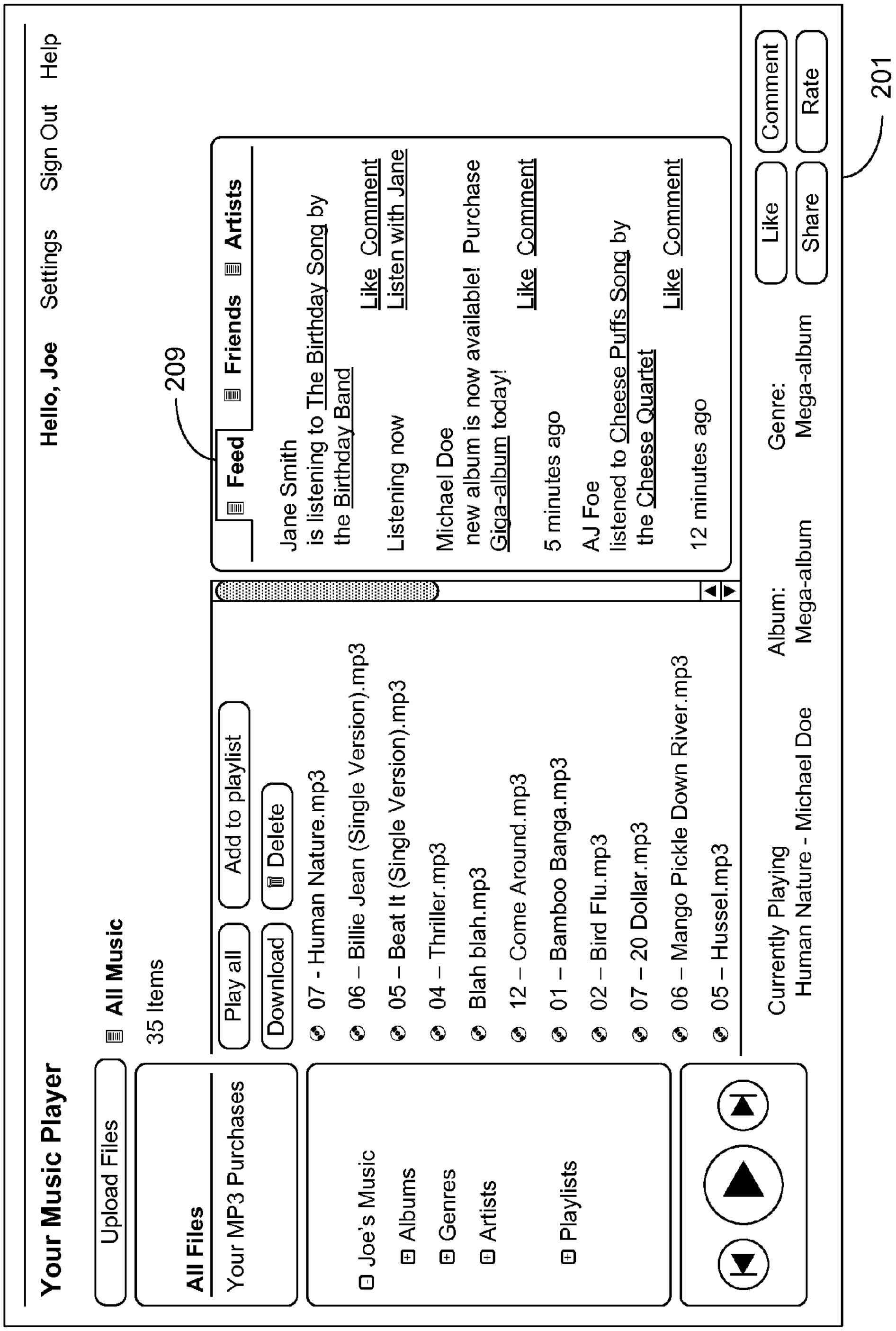
FIGS. 2-4 are drawings of an example of user interfaces rendered by a client in the networked environment of FIG. 1 according to various embodiments of the present disclosure.

FIG. 2 illustrates one example of a media player user interface 201 that can be generated by the media player application 119. In some embodiments, as is noted above, a media player user interface 201 can be rendered in a browser on a client 106 as well as in a client media player application 187. FIG. 2 illustrates one example of a social network module 209 that can be included in a media player user interface 201.

FIG. 2 illustrates an example of an information feed that can include updates generated by the media player application 119. In the depicted example, the social network module 209 can include updates that correspond to activity captured in a media player user interface corresponding to other users to whom the user is linked in a social networking system, a publishing network, microblogging network, or other systems as can be appreciated. In other words, the media player application 119 can publish information in the social network module 209 that is related to actions occurring in music player user interfaces associated with other users to whom the user is linked. As noted above, the users can be linked to one another in a third party system 105, and the third party system connector 121 can facilitate discovery of users to whom the user can be linked in the social network module 209. In one embodiment, the media player application 119 can discover a user's friends, followers, users followed, or other any other user linkages to identify content that can be published in the social network module. Additionally, the media player application 119 can publish content in the social network module that is related to media in a user's media library. For example, the music player application 119 can publish content that is published by or that is related to artists, songs and/or albums in the user's media library that is published in a third party system 105.

Additionally, the music player application 121 can throttle information that is published in the social network module 209 by publishing information related to media consumption of linked users only when the information is relevant to the user in some way. Accordingly, the music player application 121 can calculate a relevance measure that expresses a relevance to the user, and only publish media updates associated with linked users when the relevance measure of the media update exceeds a threshold. In one embodiment, a high relevance measure can be associated with a media update that is associated with a song, artist, author, title, genre and/or any other meta data that also exists within a media library of the user. In another embodiment, a high relevance measure can be associated with a media update that is associated with a song, artist, author, title, genre and/or any other meta data that is related to a currently playing track in the media player user interface. In this way, media updates that are relevant to media owned by the user can be published, while those that are unrelated to media owned by the user are not. Similarly, media updates that are relevant to media currently and/or recently played by the user in the media player user interface can be published in the social network module 209, while media that is unrelated to media currently and/or recently played are not.

In one embodiment, the music player application 119 can determine whether a media update is associated with a particular song. Accordingly, the music player application 119 can determine whether the user is currently playing and/or owns the song in his or her media library. If one or both of the conditions are met, the media player application 119 can publish the media update in the social network module 209. If neither condition is met, the media player application 119 can suppress the media update from publication in the social network module 209.

As another example, the music player application 119 can generate media recommendations that may not be present in the media library of the user. Accordingly, if a media update is related to a media recommendation associated with the user, it can be published in the social network module 209 while media updates that are not related to a music recommendation associated with the user can be suppressed. In one embodiment, the music player application 119 can determine whether the media update is associated with an artist, genre, or other category that is in turn associated with such a media recommendation and suppress media updates that are not. In another embodiment, the music player application 119 can determine whether the media update is associated with a specific song that corresponds to a media recommendation and suppress media updates that are not associated with the specific song corresponding to the media recommendation.

Additionally, the media player application 119 can also generate updates that express media in which the user has recently expressed a higher degree of interest relative to other media. In other words, the media player application 119 can identify certain media in which the user is passionate and generate a corresponding media update that is published in the social network modules of linked users. As an example, the media player application 119 can identify media in the consumption history of the user over a predefined period of time (e.g., the previous week, days, amount of usage time, etc.) that the user has consumed, viewed, or listened to more often than others. Accordingly, the media player application 119 can generate a media update that can be published in the social network module of linked users that expresses that the user has expressed a recent interest or passion in the most often consumed media during the predefined period of time. As another example, the media player application 119 can identify other aspects of media in the consumption history of a user and generate corresponding updates for publication to linked users. For example, the media player application 119 can identify certain artists, genres or other categories of media that are most often consumed by the user over the predefined period of time and generate an update that the user has expressed a recent interest of passion in the most often consumed media. The media player application can also publish data corresponding to media in which the user consumes more often that other media in a profile page associated with the user.

Figure 3:
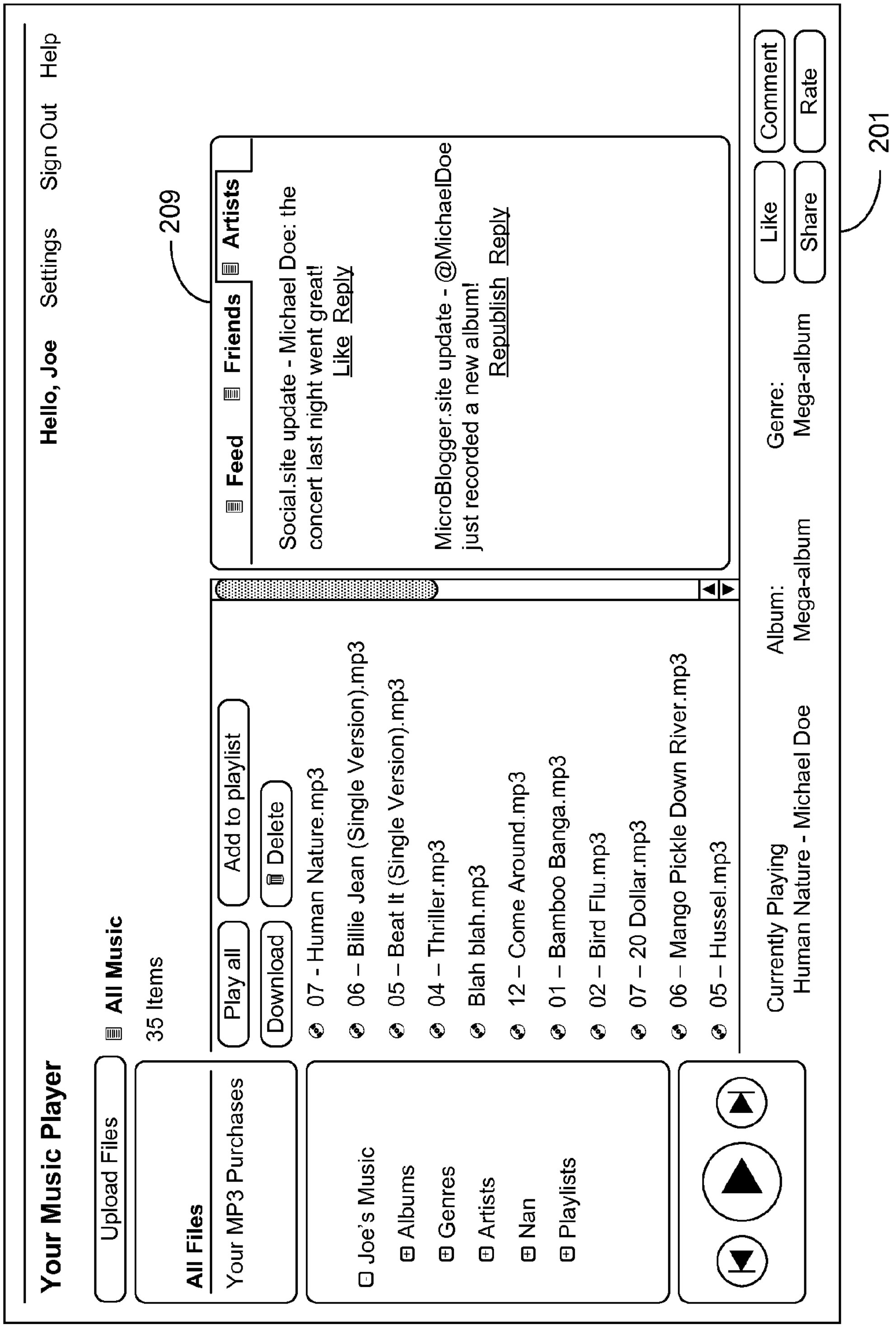

In the depicted example, the information feed can include content related to users to whom the user is linked as well as artists in the user's media library and/or in which the user has expressed an interest. In this sense, the depicted view of the social network module can represent a consolidated information feed that can provide a comprehensive feed. Therefore, reference is now made to FIG. 3, which represents an alternative example of a social network module 209 in a media player user interface 201. The example of FIG. 3 illustrates one way that an information feed presented in a social network module 209 can be filtered by the user via the media player user interface 201. In the depicted example, the media player application 119 can retrieve information related to and/or published by artists in which the user has expressed an interest and/or has in a media library.

The example of FIG. 3 illustrates examples of content that the media player application 119 can retrieve from various third party systems 105 and with which it can populate the social network module 209. In the depicted example, the content can be retrieved from a social networking system, a microblogging network, or any other third party system 105 identified by the media player application 119 or the user.

Figure 4:
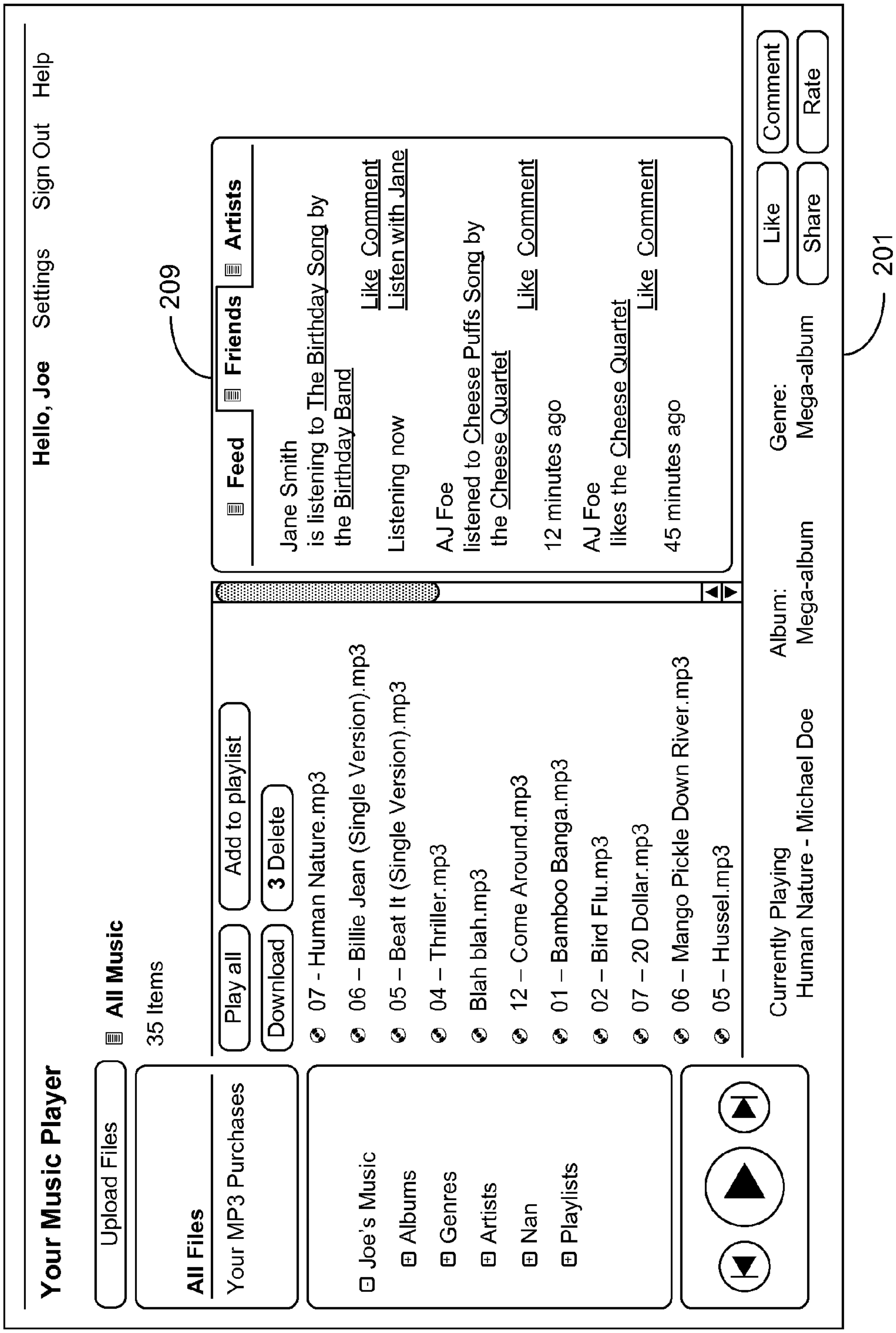

Reference is now made to FIG. 4, which illustrates an example of an information feed that contains updates that correspond to activity captured in a media player user interface of users to whom the illustrated user is linked. As noted above, the user can be linked to these users via a social networking system, microblogging network, or any other third party system 105. In the depicted example, the social network module can contain updates that correspond to the playing of a song by a linked user and/or other certain actions of the user's interactions with the media player user interface 201, such as the user expressing that he or she likes a certain media item, ratings of media entered by the user via the media player application 119, or other information that can be extracted from third party systems 105 that is related to linked users.

Figure 5:
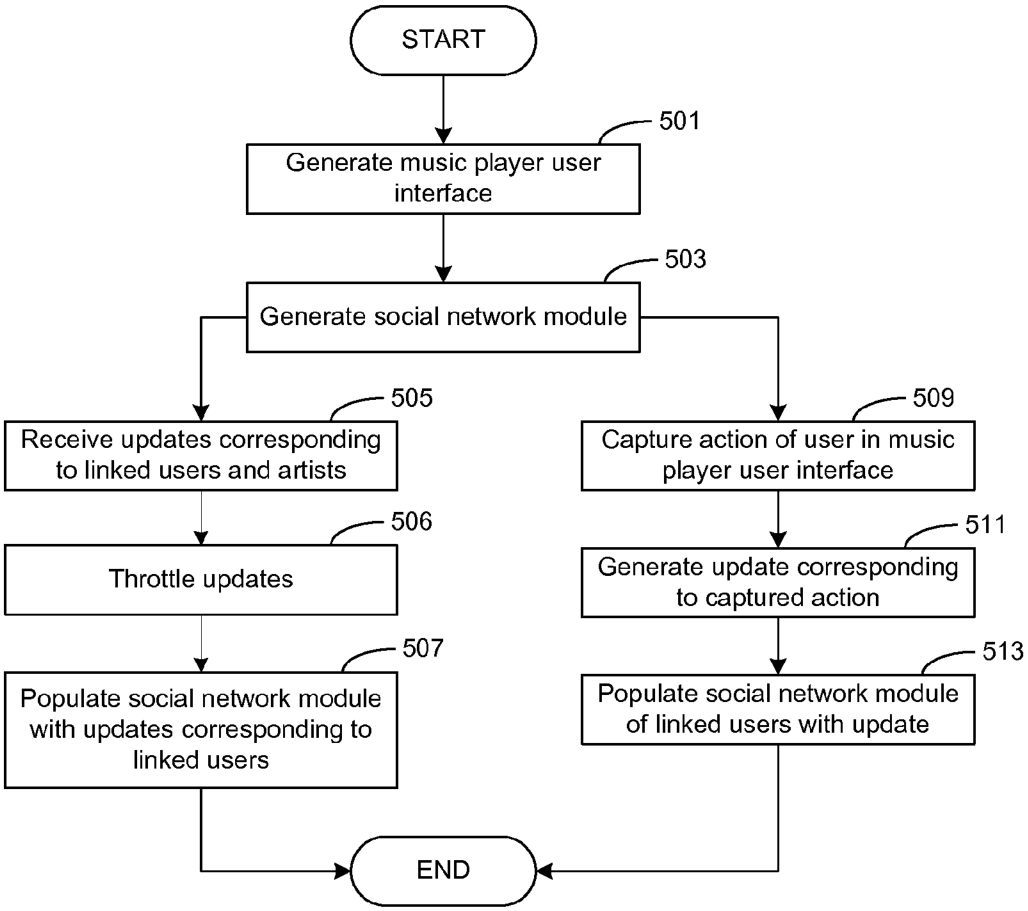
FIG. 5 is a flowchart illustrating one example of functionality implemented as portions of media player application executed in a computing device in the networked environment of FIG. 1 according to various embodiments of the present disclosure.

Referring next to FIG. 5, shown is a flowchart that provides one example of the operation of a portion of the media player application 119 according to various embodiments. It is understood that the flowchart of FIG. 5 provides merely an example of the many different types of functional arrangements that may be employed to implement the operation of the portion of the media player application 119 as described herein. As an alternative, the flowchart of FIG. 5 may be viewed as depicting an example of steps of a method implemented in the computing device 103 (FIG. 5) according to one or more embodiments. The depicted embodiment can represent execution of the media player application 119 to populate a social network module with information about linked users in the context of a browser based media player user interface. In other embodiments, as noted above, a client media player application 187 can be executed that facilitates the functionality described herein in conjunction with a media player application 119 executed on a computing device 103.

Beginning with box 501, the media player application 119 can generate a media player user interface that allows a user to browse, play and/or view media from a media library associated with a user. In box 503, the media player application 119 can generate a social network module in the media player user interface in which updates associated with linked users can be presented. From there, the media player application 119 can execute parallel pathways that allow the capture of actions to be provided in the social network modules of linked users as well as the presentation of information in the user's social network module. Accordingly, in box 505, the media player application 119 can receive updates corresponding to linked users as well as artists. In box 506, the music player application 119 can throttle updates by determining whether the updates are related to media in which the user has expressed an interest, owns, and/or that the user is presently consuming as described above. In box 507, the updates can then be published in the social network module in box 507.

In box 509, the media player application 119 can capture actions of a user's interactions with the media player user interface. As described herein, the media player application 119 can capture media that the user plays and/or browses. The media player application 119 can capture additional actions such as media the user in which a user indicates liking, on which the user comments, and other interactions with the media player user interface. In box 511, the media player application 119 can generate an update corresponding the capture action and populate the social network module in a media player user interface of linked users in box 513.

Figure 6:
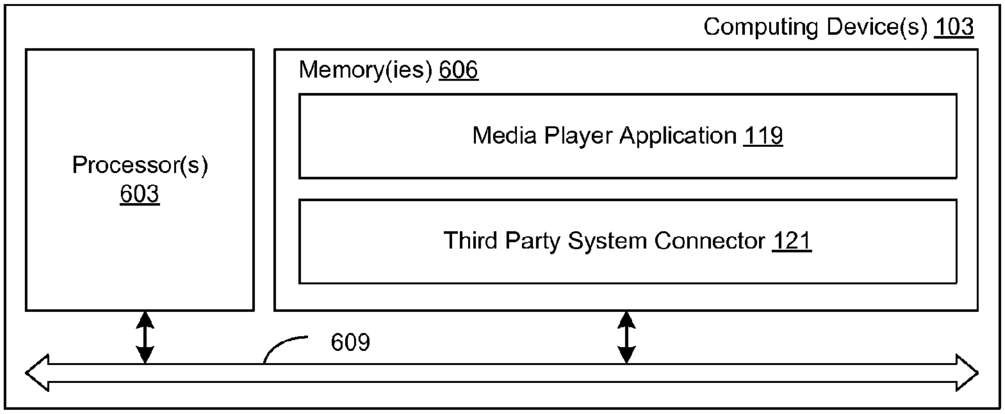
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accomusic player applicationnying address/control bus or other bus structure as can be appreciated.

Stored in the memory 606 are both data and several components that are executable by the processor 603. In particular, stored in the memory 606 and executable by the processor 603 are the media player application 119 and potentially other applications. Also stored in the memory 606 may be a data store 120 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as comusic player applicationct disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network 109 that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the media player application 119 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 5 shows the functionality and operation of an implementation of portions of the media player application 119. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. Further, in some embodiments, one or more of the blocks shown in FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the media player application 119, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:

code that identifies at least one linked user that is linked in a social networking system to a user;

code that generates a media player user interface, the media player user interface comprising a social network module, the social network module further comprising a comment user interface element, the comment user interface element configured to receive a comment associated with at least one of a song, an author, an artist, an album, or a genre appearing within the social network module;

code that transmits the media player user interface to a client associated with the user;

code that obtains at least one update associated with the at least one linked user, the at least one update associated with media consumed by the at least one linked user in another media player user interface associated with the at least one linked user;

code that calculates a relevance measure associated with the at least one update, the relevance measure expressing a degree of relevance between the at least one update and at least one item from a media library of the user;

code that populates the social network module with the at least one update when the relevance measure of the at least one update meets a relevancy threshold;

code that receives the comment submitted via the social network module;

code that publishes the comment in a respective social network module associated with the at least one linked user;

code that captures at least one media player action associated with the user occurring in the media player user interface;

code that generates another update associated with the at least one media player action and the user; and code that publishes the other update in the respective social network module associated with the at least one linked user.

2. A system, comprising:

at least one computing device; and a media player application executable in the at least one computing device, the media player application comprising:

logic that generates a media player user interface on behalf of a user associated with a user account;

logic that generates a social network module in the media player user interface, the social network module further comprising a comment user interface element, the comment user interface element configured to receive a comment associated with at least one of a song, an author, an artist, an album, or a genre appearing within the social network module;

logic that calculates a relevance measure corresponding to at least one media update associated with another user linked with the user in a social networking system, the relevance measure expressing a degree of relevance between the at least one media update and at least one item from a media library of the user;

logic that populates the social network module with the at least one media update when the relevance measure of the at least one media update meets a relevancy threshold;

logic that captures at least one media player action associated with the user occurring in the media player user interface;

logic that receives the comment from the media player user interface;

logic that publishes the comment in a respective social network module associated with the other user;

logic that generates another media update associated with the at least one media player action and the user; and logic that publishes the other media update in the respective social network module associated with the other user.

3. The system of claim 2, wherein the at least one media update further comprises an identity of the song, the author, the album, the artist, or the genre.

4. The system of claim 2, wherein the at least one media player action further comprises a playing of a track in the media player user interface.

5. The system of claim 2, wherein the at least one media player action further comprises a rating received from the user, the rating being associated with the at least one of the song, the author, the artist, the album, or the genre.

6. The system of claim 2, wherein the social network module further comprises a user interface element allowing the user to indicate that the user likes a track currently playing in the media player user interface.

7. The system of claim 2, wherein the social network module further comprises a user interface element allowing the user to indicate that the user likes at least one of an author, an artist, an album, or a genre associated with a track currently playing in the media player user interface.

8. The system of claim 2, wherein the media player application further comprises:

logic that receives a request from the media player user interface to share an audio stream associated with a currently playing track with the other user;

logic that identifies a track position within the currently playing track; and logic that initiates a new audio stream of the currently playing track from the track position in another music player user interface associated with the other user.

9. The system of claim 2, wherein the media player application further comprises:

logic that receives a request from the media player user interface to share an audio stream associated with a currently playing track in another media player user interface associated with the other user; and logic that transmits the audio stream to the media player user interface associated with the user.

10. A method, comprising:

generating, in a client device, a media player user interface rendered on a display associated with the client device, the media player user interface being associated with a first user;

generating, in the client device, a social network module in the media player user interface;

capturing, in the client device, at least one media player action associated with the first user occurring in the media player user interface;

transmitting, from the client device, the at least one media player action to a media player application executed in at least one computing device;

receiving, in the client device, a media player update associated with a second user;

calculating, in the client device, a relevance measure corresponding to the media player update, the relevance measure expressing a degree of relevance between the media player update and at least one item from a media library of the first user;

updating, in the client device, the social network module with the media player update when the relevancy measure meets a relevancy threshold, the social network module further comprising a comment user interface element, the comment user interface element configured to receive a comment associated with the media player update;

receiving, in the client device, the comment via the media player user interface; and transmitting, from the client device, the comment to the media player application executed in the at least one computing device, the comment being published in another media player user interface associated with the second user.

11. The method of claim 10, wherein the media player update further comprises an identity of one of a song, an author, an album, an artist, or a genre associated with a currently playing track in the media player user interface.

12. The method of claim 10, wherein the at least one media player action further comprises a playing of a track in the media player user interface.

13. The method of claim 10, wherein the at least one media player action further comprises a rating received from the first user, the rating associated with at least one of a song, an author, an artist, an album, or a genre.

14. The method of claim 10, wherein the social network module further comprises a user interface element allowing the first user to indicate that the first user likes a track currently playing in the media player user interface.

15. The method of claim 10, wherein the social network module further comprises a user interface element allowing the first user to indicate that the first user likes at least one of an author, an artist, an album, or a genre associated with a track currently playing in the media player user interface.

16. The method of claim 10, further comprising:

transmitting, from the client device, a request to share an audio stream associated with a currently playing track with the second user; and initiating, from the client device, a new audio stream from the at least one computing device of the currently playing track from a current track position in the media player user interface.

* * * * *